April 9, 1929. H. S. BURNHAM 1,708,256
PISTON PACKING
Filed Oct. 29, 1927
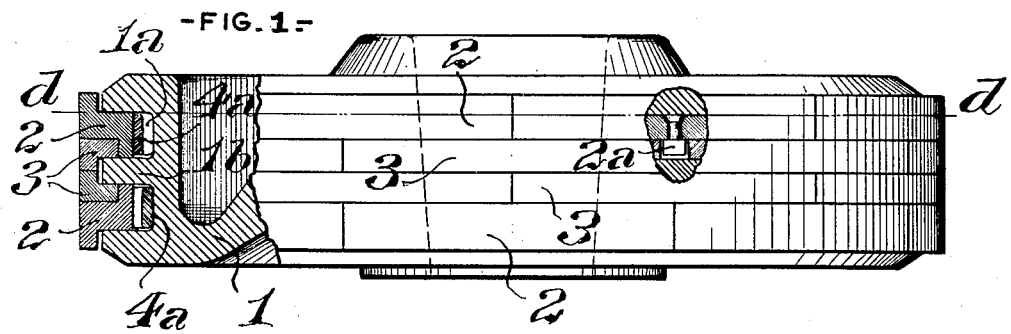
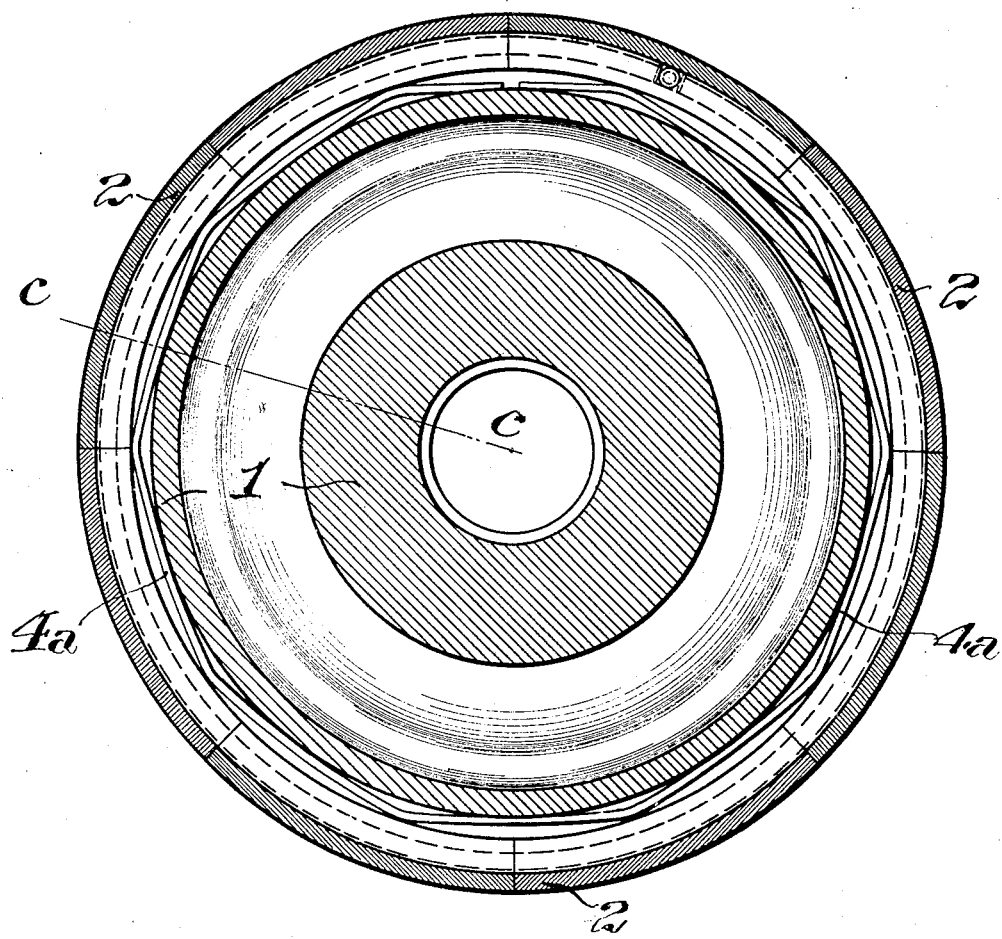

Patented Apr. 9, 1929.

UNITED STATES PATENT OFFICE.

HARRY S. BURNHAM, OF SCHENECTADY, NEW YORK.

PISTON PACKING.

Application filed October 29, 1927. Serial No. 229,622.

This invention relates to metallic packing for the pistons of steam engines, and its object is to provide means whereby the bull rings heretofore applied in connection with said pistons, may be dispensed with, and the piston be formed as an integral member, which does not make contact with the cylinder in which, in service, it is enclosed.

The improvement claimed is hereinafter fully set forth.

In the accompanying drawings: Figure 1 is a view, partly in side elevation and partly in transverse section, on the line $c\,c$ of Fig. 2, of a steam engine piston, illustrating an embodiment of the invention; Fig. 2, a transverse section, on the line $d\,d$ of Fig. 1.

In the practice of the invention, referring descriptively to the specific embodiment thereof which is herein exemplified, the piston, 1, which is an integral member, of ordinary form, and of a diameter less than that of the cylinder in which it is designed to operate, is peripherally recessed for the reception of the packing rings hereinafter described, two channels or grooves, $1^a$, $1^a$, of rectangular section, which are separated by an intermediate rib, $1^b$, being formed in its rim. A packing ring unit, of T transverse section, is fitted in each of the channels, $1^a$, of the piston.

Each of the two packing ring units comprises a plurality of circumferentially adjoining Z section segmental members, 2, and a plurality of similarly adjoining L section segmental members, 3, fitting on the Z section members. The individual members of each set, the Z section and the L section, respectively, being circumferentially adjoining, that is to say, segmental and disposed end to end in a channel of the piston, constitute, as so aggregated, a complete ring, and, to prevent steam leakage between the ends of the members, those of one set are preferably fitted to overlap those of the other, as clearly shown in Fig. 1. In order to prevent relative rotation of the rings of Z section and L section members, a block, $2^a$, is secured to one of the Z section members, and engaged with a corresponding opening in the L section member adjoining.

The composite T section packing ring units above described, surround, and project circumferentially beyond, the rim of the piston 1, so that contact of the latter, with the wall of the cylinder in which it is installed, is prevented. Each of the packing ring units is forced outwardly against the wall of the cylinder by a split expander ring $4^a$, of suitable spring metal, rectangular in section. The present invention is directed to structures wherein the pistons are formed of metal, the coefficient of expansion of which is substantially greater than that of the packing rings, which requires that a greater clearance be provided between the packing rings and the periphery of the piston, than would otherwise be the case. The weight of the piston cannot, in such case, be transmitted through the flanges on the packing rings, as such transmission would disturb the alignment of the piston rod, by an amount equal to the clearance. In such cases, a ring $4^a$ is employed which is bent into a plurality of flat portions, greater in number than the number of segments in the packing ring. The flat portions bear, at their ends, against the packing ring sections, 2, forcing them further outwardly than the space which separates them from the rim of the piston, and bear, intermediately of their ends, on the bottom of the channel, $1^a$, in the piston, thereby allowing the weight of the piston to rest on, and be borne by, the expander ring.

It has been found unsatisfactory, in practice, to allow a piston, having a steel body, to come in contact with the softer cast iron of the cylinder wall, and, in the use of steel pistons, it has been the practice to secure a separate bull ring, of suitable material, to the steel body of the piston, said ring being grooved or channelled to receive the packing. The present invention enables the separate ring to be dispensed with, and effects a corresponding economy of labor, weight, and cost.

What is claimed as new and desired to be secured by Letters Patent is:

The combination with a steam engine piston having a channel in its rim; of a composite T section bearing ring unit, comprising a ring formed of a plurality of Z section segments disposed end to end, and a plurality of L section segments engaging the Z section segments, said unit being of greater diameter than the piston and clear of the rim of the piston, a part of the unit fitting in the channel thereof; and an expander ring interposed between the bottom of the channel in the piston and the ring unit, bent into a plurality of flat portions equal in number to at least the number of Z sections of the unit ring, whereby the expander ring will engage each of the Z sections and the bottom of the said channel.

HARRY S. BURNHAM.